Figure 1:
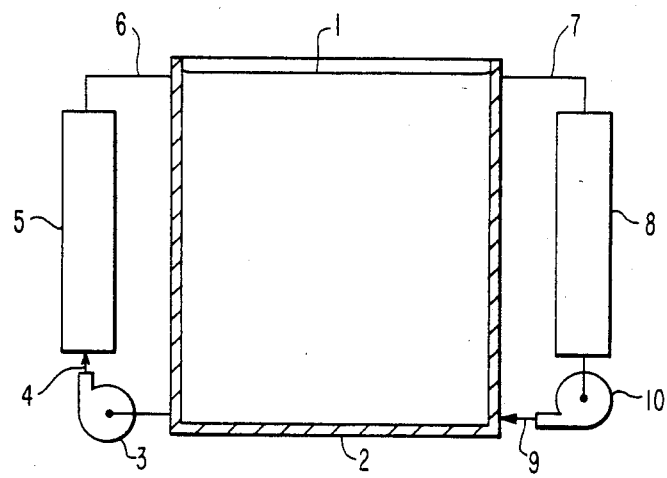

United States Patent [19]

Oommen

[11] Patent Number: 4,568,467
[45] Date of Patent: Feb. 4, 1986

[54] REDUCING CHARGING TENDENCIES IN FLOWING NON-AQUEOUS LIQUIDS

[75] Inventor: Thottathil V. Oommen, Hermitage, Pa.

[73] Assignee: Westinghouse Electric Corp., Pittsburgh, Pa.

[21] Appl. No.: 574,493

[22] Filed: Jan. 27, 1984

[51] Int. Cl.[4] .............................................. B01D 15/04
[52] U.S. Cl. .................................... 210/681; 210/683; 210/686; 210/251
[58] Field of Search ................. 208/14; 210/660, 683, 210/690, 681, 686, 251; 570/239

[56] References Cited

U.S. PATENT DOCUMENTS

| 2,888,495 | 5/1959 | Kissling | 570/239 |
| 3,282,831 | 11/1966 | Hamm | 210/690 |
| 4,189,391 | 2/1980 | Kimura et al. | 208/14 |
| 4,430,205 | 2/1984 | Felsky | 208/14 |

Primary Examiner—Ivars Cintins
Attorney, Agent, or Firm—R. D. Fuerle

[57] ABSTRACT

Disclosed is a method of reducing the charging tendency in a flowing non-aqueous liquid which has a dielectric constant of less than about 50, by passing the liquid through an ion exchange resin charged with a weakly polar active group. Also disclosed is a combination of a transformer cooled by flowing organic insulating liquid and an anionic ion exchange resin and means for passing the liquid through the resin.

11 Claims, 2 Drawing Figures

REDUCING CHARGING TENDENCIES IN FLOWING NON-AQUEOUS LIQUIDS

BACKGROUND OF THE INVENTION

When a non-polar liquid which has a low dielectric constant flows past an insulator an electrostatic charge can build up on the insulator. This electrostatic charge can result in sparks and partial discharges which break down or pit the insulation. If the flowing liquid is combustible, such as an aircraft fuel, the sparks may ignite the liquid and cause an explosion.

The tendency for liquid to generate, electrostatic charges is called the charging tendency, which is equal to the charge density, (q/v), which equals the integral of (idt/v) where q is the charge, d is the volume of the liquid, i is the charging current, and t is flow time. If i is taken to be the average current, then the charge density reduces to (it/v) which equals the charging current over the flow rate, where (v/t) is the flow rate.

The electrostatic charges on insulators in contact with a moving liquid can be reduced to some extent by grounding conductors in contact with the liquid or the insulators. However, this is not always very effective.

The charging tendency of a liquid can be reduced by adding anti-static additives to the liquid which make the liquid conductive. Obviously, these additives cannot be used if the liquid is to function as an insulator.

Finally, some reduction in the charging tendency of a liquid can be obtained by filtering the liquid through clay. While this method was used at one time to continuously filter transformer oil, it since has been dropped because the clay is not very effective and is quickly exhausted. Also, the clay may remove aromatics from the oil, which are desirable because they tend to reduce corona.

SUMMARY OF THE INVENTION

I have discovered that the charging tendency of a non-aqueous fluid can be markedly reduced by passing the fluid through an appropriate ion exchange resin. This treatment greatly reduces the danger of explosion in combustible liquids due to the buildup of electrostatic charges. In insulating liquids, it reduces electrical equipment failures due to the breakdown of insulation from electrostatic charges.

I have further discovered that the increase in charging tendencies of flowing non-polar liquids appears to be due to the presence of surfactants in the liquids. The ion exchange resins are believed to be effective in reducing the charging tendencies of the liquid because they remove these surfactants from the liquid and replace them with species which are not surface active agents.

RELEVANT ART

U.S. Pat. No. 2,578,937 discloses the removal of salts and other polar substances from solutions by means of ion exchange synthetic resins. This invention is applicable to the purification of solutions of organic materials containing polar impurities.

DESCRIPTION OF INVENTION

Figure 2:
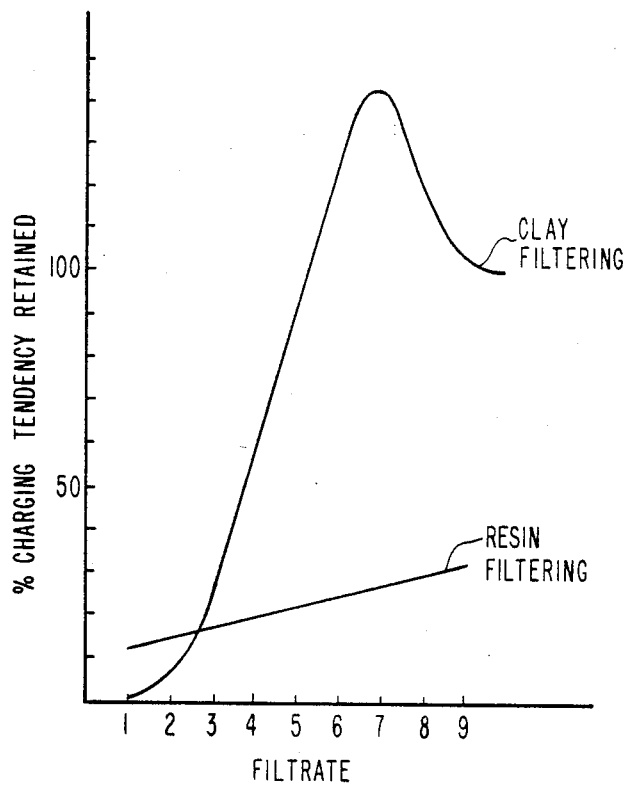

FIG. 1 is a diagrammatic side view of a certain presently preferred embodiment of a transformer in combination with an ion exchange column according to this invention; and FIG. 2 is a graph giving the results of experiments described in the example which follows.

In FIG. 1, a non-aqueous liquid 1 in transformer 2 is forced by a pump 3 through line 4, radiator 5, and back to transformer 2 through line 6. Fluid 1 also flows through line 7, ion exchange column 8, and back to the transformer through line 9. An optional pump 10 may be used to enhance the flow through the ion exchange column if convection currents prove inadequate.

This invention is applicable to any non-aqueous liquid which is relatively non-polar (i.e., generally having a dielectric constant of less than about 50). The liquid is preferably an insulating liquid (that is, a liquid having a conductivity of less than about 50 pico-siemens per meter), because these liquids are not readily treatable for charging tendency by the addition of antistatic agents. Problems with charging tendencies are common in organic insulating liquids such as hydrocarbons, silicone, and halohydrocarbons such as perchloroethylene. The liquid must be one which flows in use, for otherwise the electrostatic charge buildup will not occur.

While the contaminants in these liquids which are believed to be responsible for the buildup of electrostatic charges have not been fully characterized, they are believed to be surfactants (surface active agents), particularly sulfonate surfactants. Experimental data seems to indicate that the electrostatic charge buildup is proportional to the concentration of surfactant in the liquid. The ion exchange resin seems to work by substituting ionic species which do not build up electrostatic charges for the charge-building species already in the liquid. In order to make this substitution, the ion exchange resin must be of the same type as the contaminant in the liquid which is responsible for the buildup of electrostatic charges. That is, if the contaminant is an anionic species, the ion exchange resin should be anionic, if the contaminant is a cationic species, the ion exchange resin should be cationic, and if both anionic and cationic species are present, the ion exchange resin should be a mixture of anionic and cationic exchange resin. Since most surfactants which occur as contaminants in these fluids are anionic, and it is believed that the surfactants are responsible for the buildup of electrostatic charge, the ion exchange resin in preferably anionic. The active group on the ion exchange resin should be weakly polar because it is supposed to remove a more polar group from the liquid, thereby lowering the ionic forces operative in adsorption sites at the interface. Suitable active groups include

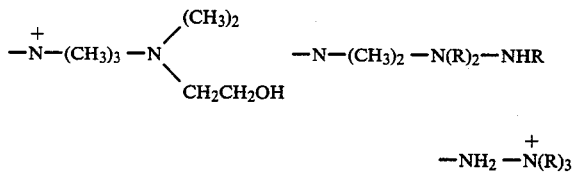

where R is alkyl or aryl.
The preferred active group is

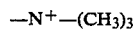

because resins having this active group have been found to work quite effectively.

The support resin (i.e., the polymer base for the active group), may be styrene, epoxy, or any other suitable resin. The amount of ion exchange resin used will depend upon the amount of contaminant in the liquid being treated. If less resin is used, of course, it will be more readily exhausted. The exhaustion of the resin can be determined by monitoring the electrostatic charge of the filtrate leaving the resin. An exhausted resin can be regenerated or discarded.

A liquid can be treated by passing it through the ion exchange resin and then placed in use, or the liquid can be circulated continuously through the ion exchange resin as it is being used. This invention is applicable to any flowing non-aqueous fluid which can create an electrostatic charge. This includes transformer oils, aviation and other fuels, and dry cleaning fluids.

The following example further illustrates this invention:

EXAMPLE 100 grams of a strong base type I macroporous styrene-divinyl benzene spherical bead anionic exchange resin, having an $-N^+-(CH_3)_3$ active group, sold by Dow Chemical Company under the trade designation "Dowex MSA1," were placed in a glass column $1\frac{3}{8}''$ in diameter and 20" high having a sintered glass filter on the bottom. The charging tendency of 1 gallon of transformer oil (mineral oil) sold by Gulf Oil Corporation under the trade designation "Transcrest H" was measured as 240. The transformer oil was passed through the anion exchange resin into a series of 500 ml glass bottles. After each 450 ml of oil had passed through the column, which took about an hour, the collecting bottle was replaced with another bottle, and the charging tendency of the filtrate was measured. The identical procedure was repeated using 100 grams of 30 to 60 mesh attapulgus clay in the column instead of the resin.

FIG. 2 is a plot which gives the percent of the initial charging tendency retained after each 450 ml aliquot had passed through the resin or the clay. FIG. 2 shows that the clay quickly became exhausted while the resin retained almost all its filtering capacity over the entire experiment, and was much more effective in reducing charging tendency.

I claim:

1. A method of reducing the charging tendency in non-aqueous liquid perchloroethylene flowing in a transformer, comprising passing said liquid perchloroethylene through an ion exchange resin charged with a weakly polar active group.

2. A method according to claim 1 wherein said liquid perchlorethylene is passed through said ion exchange resin prior to its use in said transformer.

3. A method according to claim 1 wherein said liquid perchloroethylene is continuously passed through said ion exchange resin as it is flowing.

4. A method according to claim 1 wherein said ion exchange resin is an anion exchange resin.

5. A method according to claim 1 wherein said active group is selected from the group consisting of

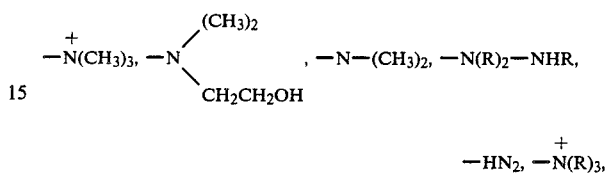

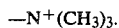

and mixtures thereof, where R is alkyl or aryl.

6. A method according to claim 1 wherein said active group is $-N^+(CH_3)_3$.

7. In a transformer cooled by flowing non-aqueous perchloroethylene, a process for treating said perchloroethylene to reduce its charging tendency in said transformer, comprising passing said perchloroethylene through a weakly polar anion exchange resin.

8. A method according to claim 7 wherein said perchloroethylene is passed through said resin prior to being placed in said transformer.

9. A method according to claim 7 wherein said perchloroethylene passes through said resin as it flows in said transformer.

10. A method of reducing charging tendency in a flowing non-aqueous liquid which has a dielectric constant less than 50 and which contains surfactant selected from the group consisting of anionic surfactants, cationic surfactants, and mixtures thereof, comprising passing said liquid through a weakly polar ion exchange resin selected from the group consisting of anionic exchange resins, cationic exchange resins, and mixed anionic-cationic exchange resins, respectively.

11. In combination, a transformer containing and cooled by flowing insulating perchloroethylene, a weakly polar, anionic ion exchange resin, and means for passing said perchloroethylene through said resin.

* * * * *